United States Patent [19]

Ibaraki

[11] Patent Number: 5,014,149
[45] Date of Patent: May 7, 1991

[54] THIN FILM MAGNETIC HEAD
[75] Inventor: Atsushi Ibaraki, Nakanoshima, Japan
[73] Assignee: Alps Electric Co., Ltd., Tokyo, Japan
[21] Appl. No.: 398,359
[22] Filed: Aug. 25, 1989
[30] Foreign Application Priority Data
Dec. 23, 1988 [JP] Japan .................. 63-325507
[51] Int. Cl.⁵ ............................. G11B 5/147
[52] U.S. Cl. .................................. 360/126
[58] Field of Search ................. 360/126, 125, 122
[56] References Cited
U.S. PATENT DOCUMENTS
4,644,432 2/1987 Heim .
4,897,749 1/1990 Perlov .................... 360/122

Primary Examiner—A. J. Heinz
Attorney, Agent, or Firm—Guy W. Shoup; Norman R. Klivans

[57] ABSTRACT

A thin film magnetic head used for a magnetic disk device. The thin film magnetic head comprises two magnetic layers, a magnetic insulating layer sandwiched between the magnetic layers, an intermediate magnetic layer which is thinner than the magnetic layers, and an intermediate magnetic insulating layer formed in the vicinity of a gap surface between the intermediate magnetic layer and one of the magnetic layers. A track width in the gap surface of the intermediate magnetic layer is narrower than a track width in the gap surface of the two magnetic layers.

3 Claims, 3 Drawing Sheets

# United States Patent Office

PTO - BOYERS, PA Duty Station

MISSING PAGE TEMPORARY NOTICE

PATENT # 5014149    FOR ISSUE DATE 5-7-91

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

COLUMN # 1, 2

Data Conversion Operation
Boyers, Pa

DESCRIPTION OF THE PREFERRED EMBODIMENTS

Figure 1:
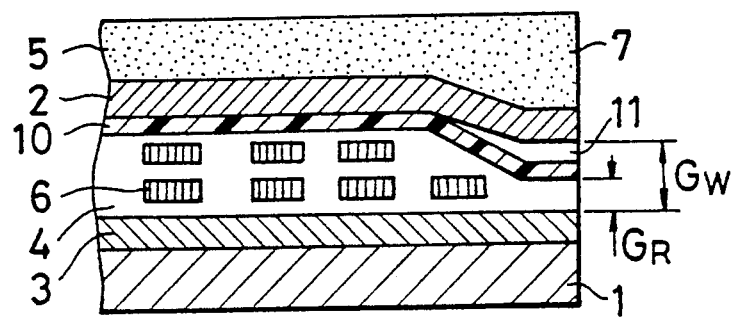
Figure 2:
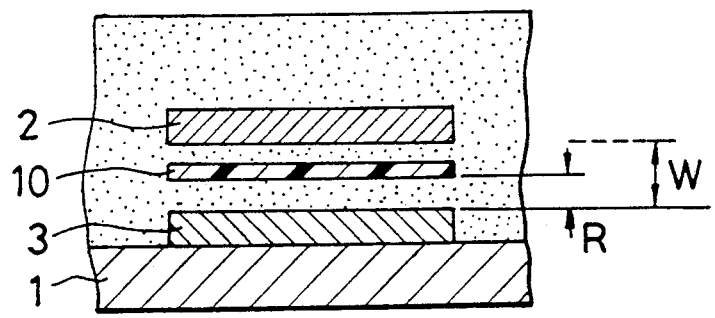

An embodiment of the present invention will be described hereinafter with reference to FIGS. 1 and 2, in which the same parts as those in the prior art are indicated by the same numerals and the description thereof is omitted.

In this embodiment, reference numeral 10 designates an intermediate magnetic layer formed of a magnetic material (such as Permalloy, Sendust, amorphous alloy, etc.), and 11 denotes an intermediate magnetic insulating layer formed of a non-magnetic material (such as $SiO_2$, $Al_2O_3$ or resin). The intermediate magnetic layer 10 is formed on the magnetic insulating layer 4 formed similarly to prior art so that the layer 10 is thinner than the upper and lower magnetic layers 2 and 3 by a sputtering method or the like; then, the intermediate magnetic insulating layer 11 is selectively formed in the vicinity of the gap surface of the intermediate magnetic layer 10 by a sputtering method or the like; and thereafter the upper magnetic layer 2 and the protective layer 5 are formed similarly to the prior art to constitute a thin film magnetic head.

In the above-described structure, the recording gap $G_W$ is formed by the upper magnetic layer 2 and the lower magnetic layer 3, and the gap width R of the reproducing gap $G_R$ is formed to be narrower than the gap width W of the recording gap $G_W$ by the intermediate magnetic layer 10 and the lower magnetic layer 3. The gap width R of the reproducing gap $G_R$ is set to be considerably narrower than the recording wavelength on the magnetic recording medium so as to reduce the gap loss during reproduction, and the gap width W of the recording gap $G_W$ is set to have a gap width so that the gap loss during reproduction is large and a signal cannot be detected. The gap width W of the recording gap $G_W$ is decided as follows, for example:

First, a gap loss $L_g$ during reproduction is roughly expressed by the following equation.

$$L_g = 20 \log 10 \left| \frac{\sin(g/\lambda \cdot x)}{g/\lambda \cdot x} \right| [dB] \quad (1)$$

g: gap width
λ: recording wavelength on a magnetic recording medium

Figure 5:
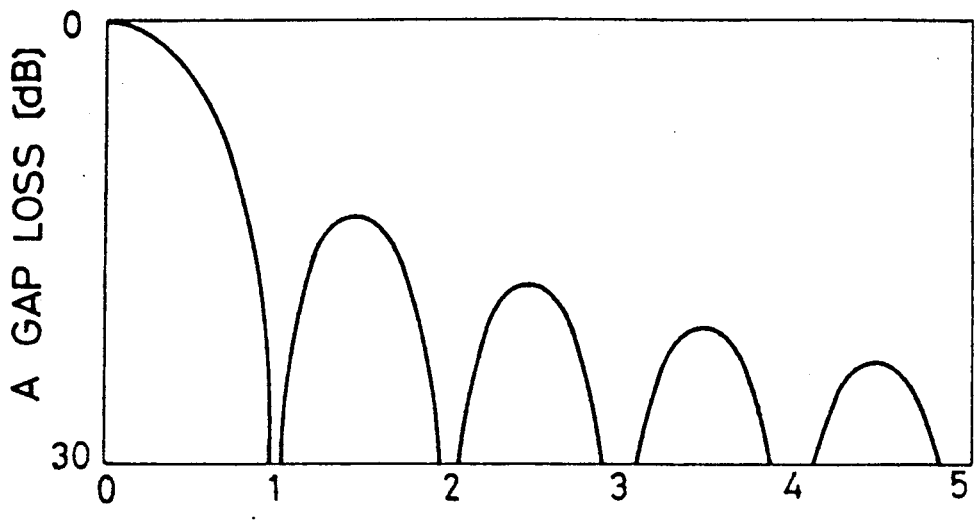
FIG. 5 is a view showing the relationship between a gap width with respect to a recording wavelength and a gap loss.
Figure 6:
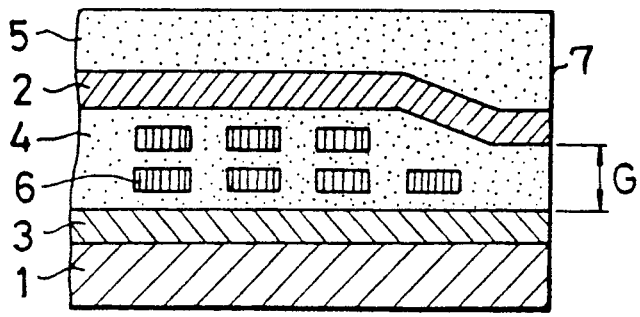
FIG. 6 is a schematic structural view of a conventional thin film magnetic head.
Figure 7:
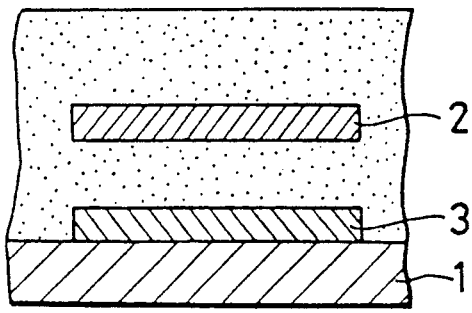
FIG. 7 is an enlarged view showing essential parts of a gap surface of the prior art.

This equation (1) is graphically shown in FIG. 5. As will be understood from FIG. 5, the gap width is present in which the gap loss during reproduction in a certain recording wavelength is the maximum. In FIG. 5, when the gap width is the same as or a multiple of the recording wavelength, the gap loss is the maximum. The gap width W of the recording gap $G_W$ is set to this condition.

According to the above-described setting, at the time of reproduction, the reproducing gap $G_R$ is small in the gap loss during reproduction since the gap width R is formed to be considerably narrow with respect to the recording wavelength, and the signal can be efficiently detected. Since the intermediate magnetic layer 10 is formed to be thin, even a fine variation in magnetic pole on the magnetic recording medium, a magnetic field within the intermediate magnetic layer 10 tends to be varied to improve a sensitivity of signal detection. Furthermore, since at that time, the recording gap $G_W$ is large in gap loss during reproduction, a signal is not detected.

Next, at the time of recording, the upper, lower and intermediate magnetic layer 2, 3 and 10 are magnetized by a signal current flowing through the conductive coil 6 within the thin film magnetic head. However, since the intermediate magnetic layer 10 is formed so that a saturated magnetic flux amount thereof is smaller than the upper and lower magnetic layers 2 and 3, the intermediate magnetic layer 10 is apparently the same as the upper magnetic insulating layer 4 because the magnetic flux becomes saturated, and the reproducing gap $G_R$ becomes invalid. In the recording gap $G_W$ formed by the upper and lower magnetic layers 2 and 3, a signal is recorded on the magnetic recording medium. The gap loss during recording is not so rapidly changed as in the gap loss during production as far as about the same adequate gap width with respect to the recording wavelength exists. The gap loss during recording does not change so much as compared with the prior art.

Figure 3:
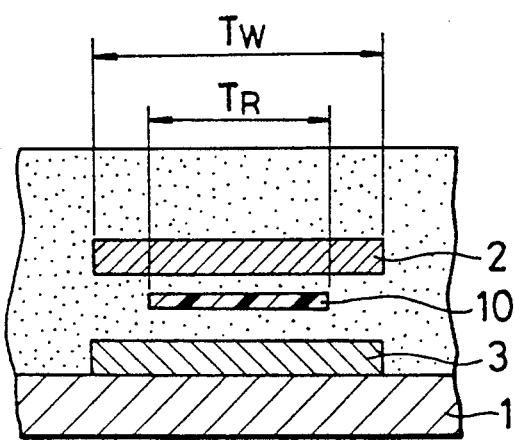

FIG. 3 shows a second embodiment according to the present invention. The width (reproducing track width) $T_R$ in the lateral direction in the gap surface 7 of the intermediate magnetic layer 10 according to the present invention is formed to be narrow as compared with the width (recording track width) in the lateral direction of the upper and lower magnetic layers 2 and 3. According to the invention, the intermediate magnetic layer 10 used for reproduction is formed independently of the upper and lower magnetic layer 2 and 3. Therefore, as shown in FIG. 3, the reproducing track width $T_R$ of the intermediate magnetic layer 10 is formed to be narrower than the recording track width $T_W$ formed by the upper and lower magnetic layers 2 and 3 whereby an off track margin in the lateral direction of the thin film magnetic head during reproduction can be increased with respect to the track width of the recording signal on the magnetic recording medium.

It is noted that the equation (1) in the above-described embodiment is a simplified equation used to facilitate the discussion of the present invention. The characteristic of the thin film magnetic head is not determined by the equation (1) and the present invention is not limited thereby.

Figure 4:
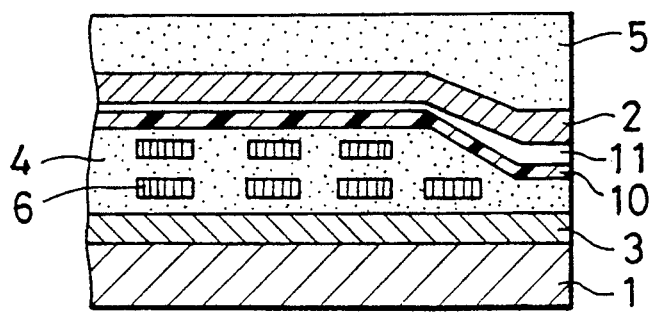

While in the above-described embodiment, the intermediate magnetic insulating layer 11 is formed merely in the vicinity of the gap surface 7 between the upper magnetic layer 2 and the intermediate magnetic layer 10, it is to be noted that the intermediate magnetic insulating layer 11 may be formed on the whole surface between the upper magnetic layer 2 and the intermediate magnetic layer 10, as shown in FIG. 4, and that the intermediate magnetic layer 10 may be formed of a material having a low saturated magnetic flux density as compared with a material for the upper and lower magnetic layers 2 and 3, to thereby more positively invalidate the function of the intermediate magnetic layer 10 during recording.

Furthermore, the lateral width of the intermediate magnetic layer 10 in the second embodiment of the present invention will suffice to be narrower than the lateral width of the upper and lower magnetic layers 2 and 3, and the whole intermediate magnetic layer 10 may be formed to be narrower than the lateral width of the upper and lower magnetic layers 2 and 3.

In the thin film magnetic head according to the present invention, as described above, the recording gap $G_W$ is formed by the upper and lower magnetic layers 2 and 3 and the reproducing gap $G_R$ is formed by the lower and intermediate magnetic layers 3 and 10. Therefore, the reproducing efficiency only can be rapidly enhanced without much changing the recording efficiency. In addition, the intermediate magnetic layer 10 is formed to be thinner than the upper and lower magnetic layers 2 and 3, whereby the sensitivity of signal detection on the magnetic recording medium is improved. This can also be provided with the high resolving power.

Moreover, since the intermediate magnetic layer 10 is formed independently of the upper and lower magnetic layers 2 and 3, the reproducing track width $T_R$ of the intermediate magnetic layer 10 is formed to be narrower than the recording track width $T_W$ of the upper and lower magnetic layers 2 and 3, whereby an off track margin during reproduction can be increased.

What is claimed is:

1. A thin magnetic head comprising:
   two magnetic layers each formed of a magnetic material;
   a magnetic insulating layer formed of a non-magnetic material, said magnetic insulating layer being sandwiched between said two magnetic layers;
   an intermediate magnetic layer formed to be thinner than said magnetic layers and within said magnetic insulating layer along one of said two magnetic layers; and
   an intermediate magnetic insulating layer formed in the vicinity of at least a gap surface between said intermediate magnetic layer and one of said magnetic layers, wherein said intermediate magnetic layer has a lower saturated magnetic flux density than does either of said two magnetic layers.

2. A thin film magnetic head according to claim 1, wherein a track width in the gap surface of said intermediate magnetic layer is formed to be narrower than a track width in the gap surface of said two magnetic layers.

3. The device of claim 1, wherein said intermediate magnetic insulating layer extends between all of said intermediate magnetic layer and said magnetic layer, and wherein said intermediate magnetic layer has substantially the same thickness in said vicinity of said gap surface as a thickness in a second vicinity spaced apart from said gap surface.

* * * * *